US011828697B2

(12) United States Patent
Sinha et al.

(10) Patent No.: US 11,828,697 B2
(45) Date of Patent: Nov. 28, 2023

(54) MULTICHANNEL EXCITATION AND EMISSION FOR MINIATURIZED, PLANAR FLUORESCENCE ACTIVATED CELL SORTING

(71) Applicant: Verily Life Sciences LLC, Mountain View, CA (US)

(72) Inventors: Supriyo Sinha, Menlo Park, CA (US); Brian Rabkin, Redwood City, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 675 days.

(21) Appl. No.: 15/612,647

(22) Filed: Jun. 2, 2017

(65) Prior Publication Data

US 2017/0350806 A1    Dec. 7, 2017

Related U.S. Application Data

(60) Provisional application No. 62/345,499, filed on Jun. 3, 2016.

(51) Int. Cl.
*G01N 15/14* (2006.01)
*B01L 3/00* (2006.01)
(Continued)

(52) U.S. Cl.
CPC .... *G01N 15/1484* (2013.01); *B01L 3/502715* (2013.01); *B01L 3/502761* (2013.01);
(Continued)

(58) Field of Classification Search
CPC ........... G01N 15/1484; G01N 15/1429; G01N 15/1436; G01N 15/1434; G01N 15/1459;
(Continued)

(56) References Cited

U.S. PATENT DOCUMENTS 9,645,010 B2    5/2017  Lo et al.
10,137,479 B2 *  11/2018  Sinha ................. G01N 15/1404
(Continued)

OTHER PUBLICATIONS

Kate Yandell, "Sorting Made Simpler," The Scientist, Dec. 2104, pp. 63-66.
(Continued)

*Primary Examiner* — Michael L Hobbs
(74) *Attorney, Agent, or Firm* — McDonnell Boehnen Hulbert & Berghoff LLP

(57) ABSTRACT

A system for fluorescence activated cell sorting includes at least two excitation lasers having different orientations relative to an objective such that light from the at least two lasers passes through the objective and intersects a fluidic channel at different positions within an interrogation region. The fluidic channel directs a flow of a plurality of fluorescently labeled particles through the interrogation region. The system further includes at least one detector and at least one optical element that directs light emitted from the plurality of fluorescently labeled particles and transmitted through the objective to the at least one detector. The system may further include optics for generating and detecting side and forward
(Continued)

scattered light. Methods for operating example systems to collect fluorescent, side scattered and forward scattered light from a plurality of particles are also described herein.

19 Claims, 4 Drawing Sheets

(51) Int. Cl.
- *G02B 21/16* (2006.01)
- *G01N 21/64* (2006.01)
- *G01N 15/10* (2006.01)
- *G01N 35/00* (2006.01)
- *G01N 15/00* (2006.01)

(52) U.S. Cl.
CPC ..... *G01N 15/1429* (2013.01); *G01N 15/1434* (2013.01); *G01N 15/1436* (2013.01); *G01N 21/6428* (2013.01); *G02B 21/16* (2013.01); *B01L 2200/0652* (2013.01); *B01L 2300/0654* (2013.01); *B01L 2300/0816* (2013.01); *G01N 15/1459* (2013.01); *G01N 21/6458* (2013.01); *G01N 2015/0065* (2013.01); *G01N 2015/1006* (2013.01); *G01N 2015/1075* (2013.01); *G01N 2015/144* (2013.01); *G01N 2015/149* (2013.01); *G01N 2015/1438* (2013.01); *G01N 2021/6419* (2013.01); *G01N 2021/6421* (2013.01); *G01N 2021/6441* (2013.01); *G01N 2035/00158* (2013.01); *G01N 2201/068* (2013.01); *G01N 2201/0636* (2013.01); *G01N 2201/06113* (2013.01)

(58) Field of Classification Search
CPC ........... G01N 21/6428; G01N 21/6458; G01N 2015/0065; G01N 2015/144; G01N 2015/149; G01N 2015/1075; G01N 2015/1438; G01N 2015/1006; G01N 2201/068; G01N 2201/0636; G01N 2201/06113; G01N 2201/6441; G01N 2021/6421; G01N 2021/6419; G01N 2021/6441; G01N 2035/1006; G02B 21/16; B01L 3/502761; B01L 3/502715; B01L 2200/0652; B01L 2300/0654; B01L 2300/0816
USPC .......... 359/398, 396, 389, 388, 372
See application file for complete search history.

(56) References Cited

U.S. PATENT DOCUMENTS

| | | | |
|---|---|---|---|
| 2002/0039737 A1 | 4/2002 | Chan et al. | |
| 2002/0045190 A1* | 4/2002 | Wilson, Jr. | C40B 30/10 435/7.1 |
| 2002/0102595 A1* | 8/2002 | Davis | C12Q 1/6869 435/6.12 |
| 2006/0263269 A1* | 11/2006 | Morozov | B01L 3/502715 422/400 |
| 2010/0193704 A1* | 8/2010 | Pratt | G01J 3/4406 250/459.1 |
| 2011/0085166 A1 | 4/2011 | Ou-Yang et al. | |
| 2011/0204256 A1* | 8/2011 | Patt | G01N 15/14 250/458.1 |
| 2012/0001090 A1 | 1/2012 | Takasaki et al. | |
| 2013/0200277 A1 | 8/2013 | Li et al. | |
| 2014/0158913 A1 | 6/2014 | Tanase | |
| 2014/0221239 A1* | 8/2014 | Carman | B01L 3/502784 506/9 |
| 2014/0339446 A1* | 11/2014 | Yamamoto | G01N 15/1434 250/576 |

OTHER PUBLICATIONS

"NanoCellect Launched WOLF Cell Sorter at CYTO 2016," PRWeb, Jun. 15, 2016.
Chun H. Chen et al., "Specific Sorting of Single Bacterial Cells with Microfabricated Fluorescence-Activated Cell Sorting and Tyramide Signal Amplification Flourescence in Situ Hybridization," Anal. Chem., 2011, 83, 7269-7275.
Sony Biotechnology, Inc., "SH00Z Cell Sorter," 2015.
Bio-Rad Laboratories, Inc., "S3e Cell Sorter," 2015.
Becton, Dickinson and Company, "BD FACSJazz," 2013.
Cellector Corporation, Scindo XLR, Technical Specification, 2014.
Cellector Corporation, Scindo XT, Technical Specification, 2014.
Cytonome/ST LLC, Cytonome Viva G1 Cell Sorter, Technical Specifications, 2014.
Miltenyi Biotec GmbH, "MACSQuant Analyzer 10 optical bench," Mar. 2016.
Miltenyi Biotec GmbH, "MACSQuant Instruments," 2014.
International Search Report and Written Opinion of International Application No. PCT/US2017/035589 dated Sep. 22, 2017.

* cited by examiner

MULTICHANNEL EXCITATION AND EMISSION FOR MINIATURIZED, PLANAR FLUORESCENCE ACTIVATED CELL SORTING

CROSS-REFERENCE TO RELATED APPLICATIONS

This application claims priority to U.S. Provisional Patent Application No. 62/345,499, filed Jun. 3, 2016, which is incorporated herein by reference.

BACKGROUND

Unless otherwise indicated herein, the materials described in this section are not prior art to the claims in this application and are not admitted to be prior art by inclusion in this section.

Fluorescence activated cell sorting (FACS) is a technique used in cytometry for measuring, sorting and enriching rare cells and particles, such as beads, from large heterogeneous populations. While FACS systems offer desirable multiplexing performance, they can be large and expensive and are typically operated by specially trained staff. As a result, FACS systems are used in only a relatively small number of facilities. To allow for more widespread availability, miniaturized FACS systems (often called "µFACS") have been developed. However, there are few commercial systems to date and those that exist have limited numbers of both detection and sorting channels compared to traditional FACS.

In one example µFACS system, the laser excitation light shares a common path with the flowing cells. This configuration can limit the microfluidic geometry and involves specialized coatings on the channel to permit optical waveguiding. Such coatings can make the chips more costly to fabricate and may not be suitable for all biological samples. Further, this example system only allows for a single excitation wavelength, which is not desirable if more than about ten fluorescent markers are to be identified. Another example µFACS system offers more channels with up to 4 excitation lasers and 8 fluorescent channels (along with two scatter channels), but employs a cuvette such that the excitation lasers are perpendicular to the collection path. Although this approach may have the advantage that the side scatter channel could be efficiently collected, it may be desirable to use widely available, planar microfluidic chips instead of cuvettes. In addition, this approach uses a large number of detectors, such as photomultiplier tubes (PMTs).

Accordingly, there is a need for systems that are compatible with existing FACS protocols, that are in a planar geometry such as a microfluidic chip, and that can employ a number of simultaneous fluorescent markers and emission channels on the order of what is possible with traditional FACS systems.

SUMMARY

The present invention is directed to µFACS systems and related methods, in particular, µFACS systems having at least two excitation lasers each positioned at an angle with respect to each other.

In one aspect, a system is provided, comprising: (a) at least two excitation lasers; (b) an objective, wherein the at least two excitation lasers have different orientations relative to the objective such that light from the at least two lasers passes through the objective and intersects a fluidic channel at different positions within an interrogation region, and wherein the fluidic channel directs a flow of a plurality of fluorescently labeled particles through the interrogation region; (c) at least one detector; and (d) at least one optical element optically coupled to the objective and the at least one detector to direct light emitted from the plurality of fluorescently labeled particles and transmitted through the objective to the at least one detector.

In another aspect, a method is provided, comprising the steps of: (a) moving a plurality of fluorescently labeled particles through a fluidic channel comprising an interrogation region, wherein the plurality of fluorescently labeled particles move through the interrogation region at a flow speed; (b) directing light from at least two excitation lasers through an objective to the fluidic channel, wherein the at least two excitation lasers have different orientations relative to the objective such that light from the at least two lasers intersects the fluidic channel at different positions within the interrogation region; (c) receiving, by at least one detector, light emitted from each of the plurality of fluorescently labeled particles and transmitted through the objective; and (d) generating, by the at least one detector, a fluorescence signal indicative of intensity of light emitted from each of the plurality of fluorescently labeled particles as the particles move through the interrogation region.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Flow cytometry is an analytical technique used to measure and analyze the physical and chemical characteristics of individual particles, such as cells, as they flow in a fluid stream through a beam of light. The properties measured can include the relative size, relative granularity or internal complexity, and relative fluorescence intensity of each individual particle. Typically, cell components are fluorescently labelled and then excited by a laser to emit light at various wavelengths. The emitted light is received up by one or more detectors, and analyzed, for example, based on how the cell or particle scatters incident laser light and emits fluorescence. FACS is a particular form of flow cytometry that enables a mixture of different particles or cells to be sorted one by one into one or more containers according to their specific light scattering and fluorescence characteristics.

Traditional FACS systems, while being generally commercially available and offering desirable capabilities, can be undesirably large and expensive. Further, while there has been an effort to develop miniaturized FACS systems (often described as µFACS systems), very few commercial µFACS systems currently exist.

In the present disclosure, an example multi-laser µFACS system includes two or more individual excitation lasers that have different orientations relative to an objective that directs the light from the at least two excitation lasers into a fluidic channel. With this orientation, the light from the at least two excitation lasers intersects the fluidic channel at different locations. The example µFACS system can have a reduced number of detectors, as compared to traditional FACS systems. In some embodiments, the µFACS system is compatible for use with a planar microfluidic chip.

Example µFACS Optical Systems

Figure 1:
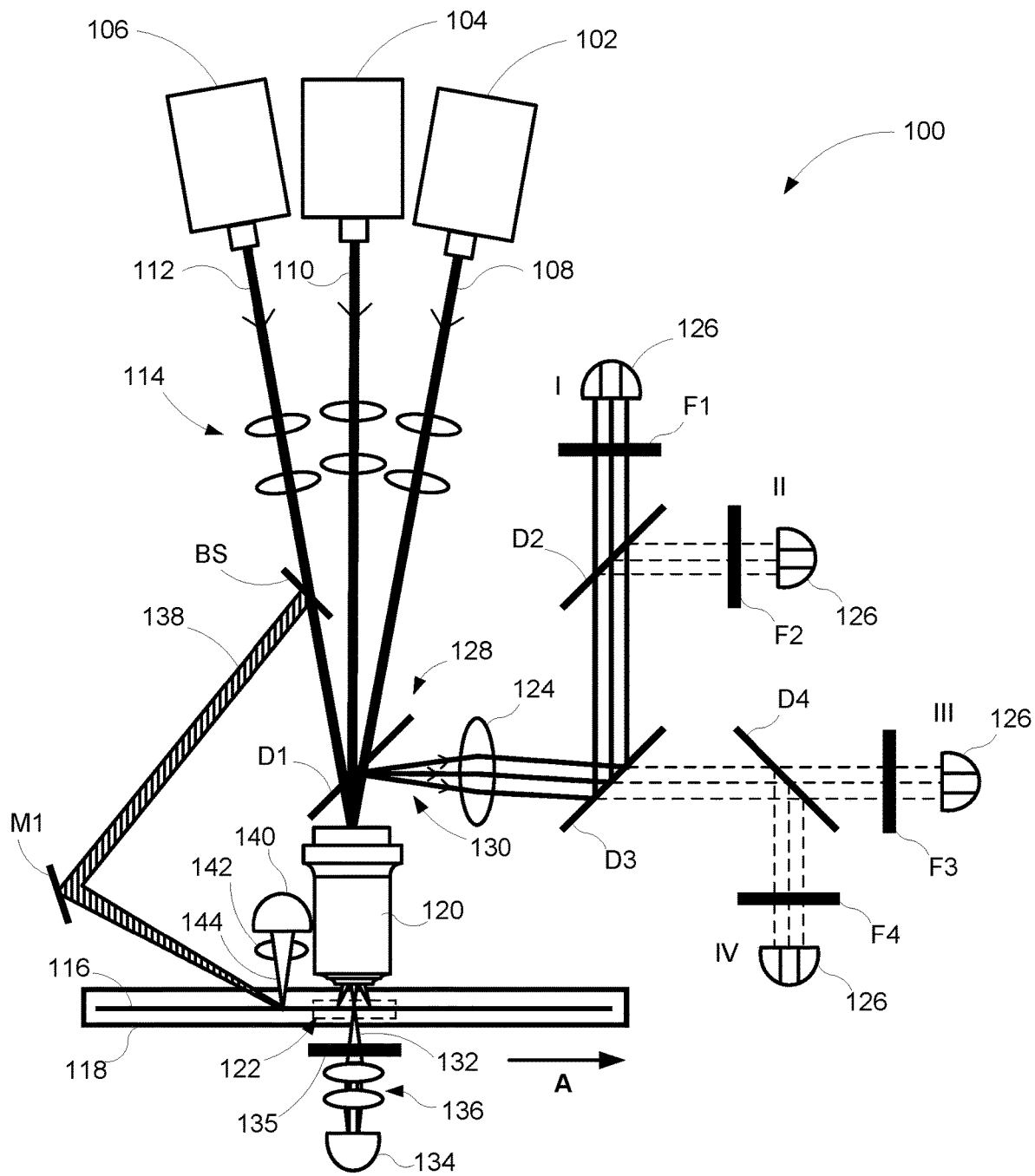
FIG. 1 is a schematic view of an example optical architecture of an embodiment of a µFACS system.

FIG. 1 illustrates a schematic of an example optical architecture of a µFACS system 100 having at least two excitation lasers. In this example, three individual excitation lasers 102, 104, 106 are provided. The use of more than three excitation lasers is contemplated. Light from the excitation lasers 102, 104, 106 is directed through an objective 120 to an interrogation region 122 of a fluidic channel 116. The fluidic channel 116, which may be defined in a planar microfluidic chip 118, directs a flow of a plurality of fluorescently labeled particles through the interrogation region 122. In the example shown in FIG. 1, the fluidic channel 116 is positioned below the objective 120, such that excitation beams 108, 110, 112 from each of the excitation lasers are incident on the fluidic channel in a plane substantially perpendicular to the direction of fluid flow (A) in the channel.

One or more cylindrical lenses 114 may be provided to shape each of the excitation beams 108, 110, 112 so that the desired beam profile is delivered to the fluidic channel 116 positioned below the microscope objective 120. In flow cytometry applications, it can be desirable to shape the excitation lasers such that they have an elliptical profile and orient the laser spots so that the longer axis of each ellipse is perpendicular to the direction of flow in the fluidic channel. In addition or instead of cylindrical lenses, anamorphic prisms or other optical elements that have different optical powers along the two axes could be used to shape the beam.

In this embodiment of system 100, the excitation lasers 102, 104, 106 are oriented such that each of the emitted beams of light 108, 110, 112 is incident on the microscope objective 120 at a different angle. Each of the lasers 108, 110, 112 has a different angle of incidence on the back aperture of the objective 120 such that each of the beams 108, 110, 112 intersects the fluidic channel 116 at different points 109, 111 and 113 within an interrogation region 122. The angle at which each of the lasers 102, 104, 106 is positioned may depend on the number of excitation lasers, the field of view of the microscope objective 120, and the desired spacing of the laser spots 109, 111, 113 on the fluidic channel 118. In some examples, the lasers 102, 104, 106 may be positioned such that the laser spots are equally spaced apart and do not overlap. The spacing between the spots may, however, be minimized so as to not leave space where particles flowing in the fluidic channel would not be under interrogation of any excitation laser. In other examples, two or more of the laser spots 109, 111, 113 (shown in FIG. 2) may be permitted to overlap if, for example, the emission spectra of the fluorophores or labels do not or only minimally overlap and the excitation wavelength from one laser doesn't overlap with the measured emission spectra of the fluorescence channels measured from any of the spatially overlapped lasers.

Figure 2:
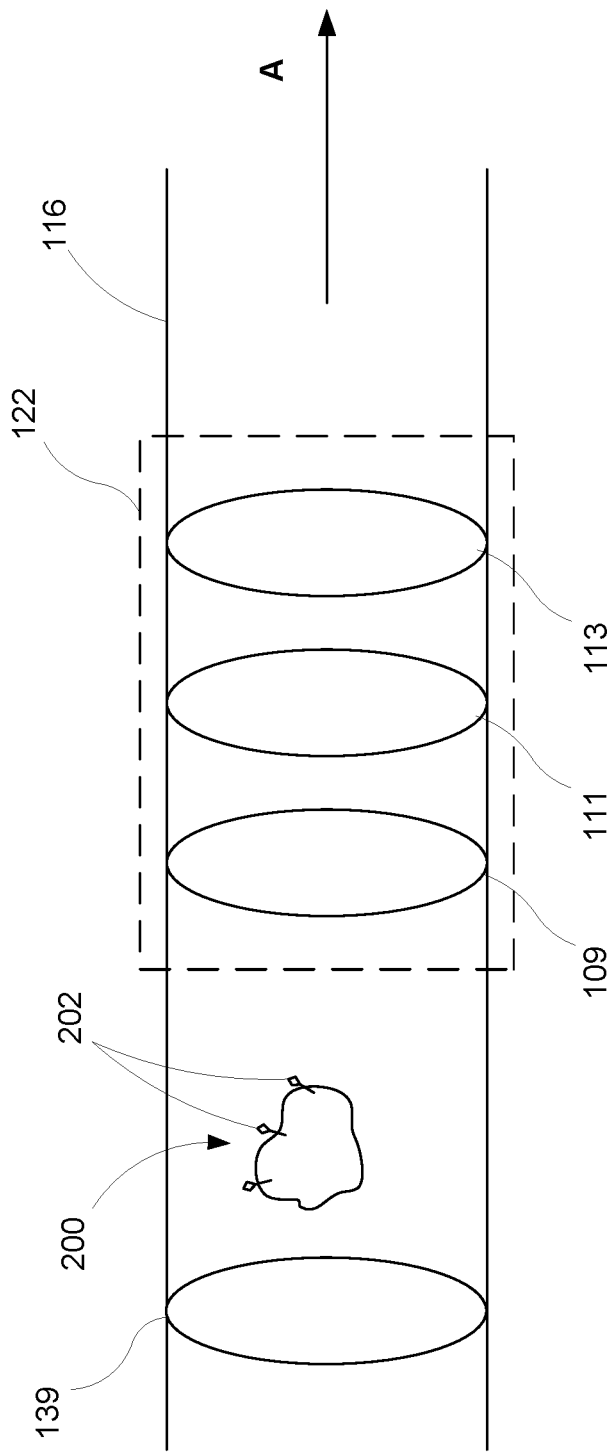
FIG. 2 is a top view of an example interrogation region of a fluidic channel, and illustrating a side scatter beam spot and interrogation beam spots generated by the example µFACS system of FIG. 1.

FIG. 2 is a top view of a portion of µFACS system 100. A sample containing a plurality of fluorescently labelled particles, such as cells, is introduced into the fluidic channel 116. The system 100 may be designed to detect a plurality of different fluorophores simultaneously by, for example, using lasers emitting at different wavelengths. For example, different types of particles or cells may each be labelled with different fluorophores, thereby allowing each type of particle or cell to be identified or categorized. The lasers 102, 104, 106 may be selected to emit at a suitable color to excite the fluorophores selected. Individual particles 200, labeled with one or more fluorophores 202, move in the fluidic channel 116 in the direction of fluid flow (A). The fluid flows at a particular flow speed, which may be known and may be manually or automatically controlled. The particle 200 is interrogated as it passes through each of the laser spots 109, 111, 113 in the interrogation region 122. Also shown is a side scatter beam spot 139, located upstream of the interrogation region 122, with respect to the direction of fluid flow (A), which will be discussed in further detail below.

Fluorescence 130 emitted from each of the laser spots 109, 111, 113 is imaged through the objective 120 and tube lens 124 (if needed) onto one or more detectors 126, such as PMTs, for each of four emission channels (I-IV). The amount of fluorescent light emitted can be correlated with the quantity of a particular cell or particle present in the sample. In the example shown in FIG. 1, the detectors 126 may be provided as multi-element detectors, thereby reducing the overall number of detectors in the system to one detector for each fluorescence wavelength channel. The tube lens 124, or other lenses, may be selected to provide sufficient spacing so that a single multi-element detector is provided for each emission wavelength. In other examples, the detectors 126 may be provided as single pixel detectors. A single pixel detector would, in this case, be provided for each emitting fluorophore excitable by each laser. The fluorescence detectors 126 measure the amplitudes of the fluorescent signals generated by the different fluorescent markers as they pass through the interrogation region 122. Numerical values are generated based on pulse heights (amplitudes) measured by each of the various detectors 126. The resulting signals can be input into a processor (not shown) and used to create histograms corresponding to the detected events.

In the illustrated embodiment of system 100, the excitation path shares a common path with the collection path, as they are both coupled through the objective 120. An optical element 128 directs light that is emitted from the plurality of fluorescently labeled particles after it passes through the objective 120 to the detectors 126. In one example, the optical element 128 is provided as a dichroic D1. The dichroic D1 can, in one example, have narrow transmission peaks for the excitation laser wavelengths and reflects all other wavelengths to the fluorescence detectors 126. For simplicity, emission channels II-IV are illustrated with broken lines. Dichroics D2, D3 and D4 direct each emitted fluorescence wavelength to a detector 126 for each respective emission channel. A bandpass filter F1, F2, F3 and F4 may also be provided for each of emission channels I-IV. While FIG. 1 illustrates dichroic D1 transmitting the excitation laser wavelengths and reflecting the emission wavelengths, this could alternatively be switched such that D1 reflects the excitation laser wavelengths and transmits the emission wavelengths. The remaining optics in the system can be reconfigured as necessary.

Alternatively, the optical element 128 may be provided as a dot mirror, in which the excitation laser beams 108, 110, 112 are reflected by small mirrors in a window (called "dot optic"). Since the emitted fluorescence light will occupy the entire back aperture of the objective 120 and a considerable amount of the area of the dot optic, the percentage of emitted light lost in the collection path due to the small mirrors is small. In the three laser system illustrated in FIG. 1, three small mirrors would be used. One possible advantage of this embodiment is that the dot mirror may be less costly to produce and may provide better performance than a multi-band dichroic, such as D1. A second advantage is that dot mirrors could be used for alignment during system construction or servicing. Alternatively, the optical element 128 may be a dot optic configured to transmit the excitation laser beams 108, 110, 112 through small apertures in a mirror.

In addition to fluorescence emission, forward and side scattered light may also be detected and measured by the system 100. A forward scatter detector 134 and a side scatter detector 140 can generate electrical signals corresponding to detected events as the cells or particles are directed through the fluid channel 116. In one example, shown in FIG. 1, one of the incident laser beams 108, 110, 112 is used for the forward scattering channel. Forward scattered light 132 is scattered through the fluidic channel 116 and is collected by the detector 134. A bandpass filter 135 and one or more tube lenses 136 may also be provided in the optical path. In some examples, the bandpass filter 135 may be positioned after one of the one or more tube lenses (with respect to the direction of propagation of light). Alternatively, or additionally, an absorptive filter 137 (shown in FIG. 3B), may be positioned before or after the bandpass filter 135 for blocking non-absorbed, non-scattered light. A composite filter, with an absorptive dot on a bandpass filter, may also be used.

For side scatter measurements, the same or a different one of the incident laser beams 108, 110, 112 can have its power partially picked off with a beamsplitter BS to provide a side scatter beam 138. A mirror M1 directs the side scatter beam 138 to the fluidic channel 116, and side scattered light 144 is diffusely reflected by particles in the fluidic channel 116. In one implementation (shown in FIG. 1), the side scatter beam 138 is directed to an area of the fluidic channel 116 that is located upstream of the interrogation region 122. In that implementation, the side scattered light 144 is detected by the detector 140 through an optical path that is separate from the objective 120. One or more tube lenses 142 may also be provided in the optical path. In an alternative implementation (not shown), the side scatter beam 138 is directed to the interrogation region 122. In this alternative implementation, the side scattered light 144 is imaged through the objective and detected by the detector 140.

The laser path used for side scatter shown in FIG. 1 (side scatter beam 138 directed to the fluidic channel 116 upstream of the interrogation region 122) could also be used for forward scatter measurements instead of using one of the incident laser beams through the objective 120. One advantage of this alternative architecture is that the system 100 may be able to detect particles more quickly if additional synchronization steps are needed, as both the side and forward scatter measurements are taken prior to the fluorescence interrogation area. In an additional alternative embodiment, if the angle of one of the non-normal incidence lasers is large enough, it may be used for side scatter as well, thereby eliminating the need for the beamsplitter BS.

The objective 120 may also be used in brightfield detection (not shown). This approach may involve an appropriate substitution of the dichroic and an incoherent light source. Brightfield detection may be used to observe the beam spots 109, 111, 113 in the field of view in order to ensure proper alignment of the spots 109, 111, 113 with the fluidic channel 116.

Figure 3A:
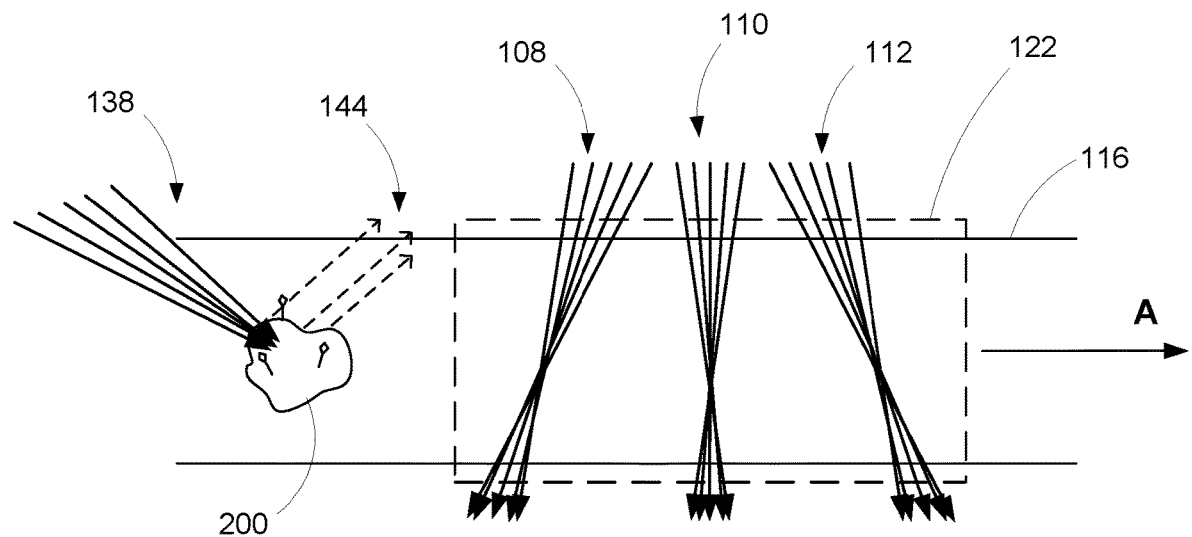
FIG. 3A is a side view of an example interrogation region, illustrating side scatter light generated as a particle passes through a side scatter beam generated by the example µFACS system of FIG. 1.
Figure 3B:
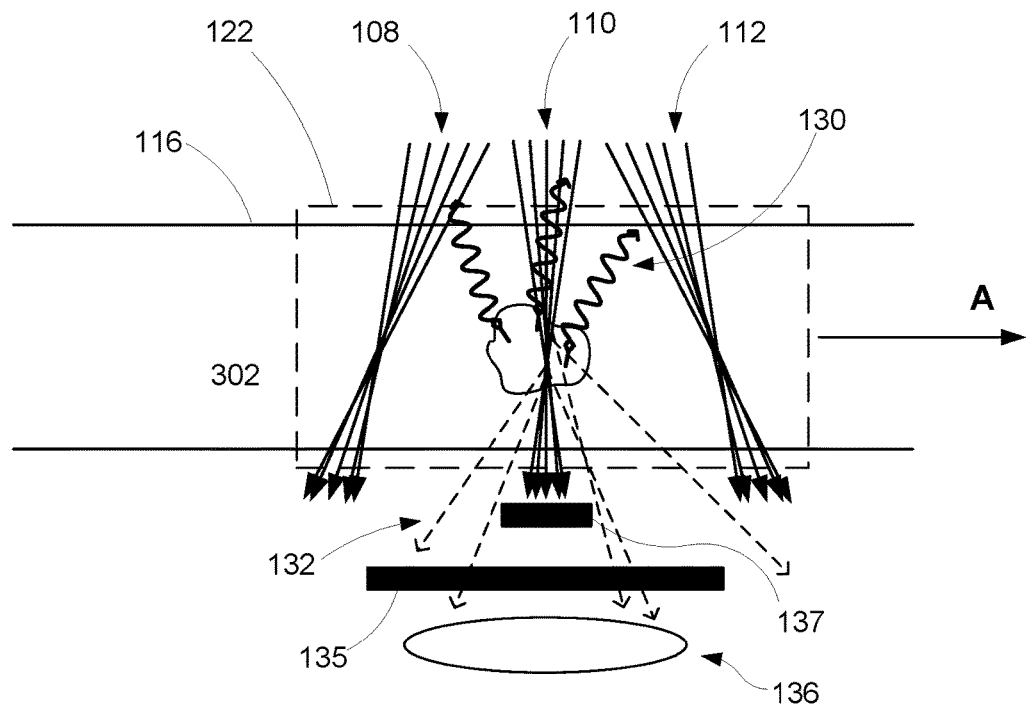
FIG. 3B is a side view of an example interrogation region, illustrating forward scatter and fluorescent light generated as a particle passes through an interrogation light beam generated by the example µFACS system of FIG. 1.

FIG. 3A and FIG. 3B illustrate a side view of a portion of the fluidic channel 116 of the system 100. In the example shown in FIG. 3A, side scattered light 144 is emitted from the fluidic channel 116 when a particle 200 passes through the side scatter beam 138. In the example shown in FIG. 3A, the system 100 is configured such that the side scatter beam 138 intersects the fluidic channel 116 at a position upstream of the position at which the excitation laser beams 108, 110, 112 intersect the channel 116. Alternatively, the side scatter beam 138 could intersect the fluidic channel 116 within the interrogation region 122 so that the side scattered light 144 is imaged through the objective 120.

In the example shown in FIG. 3B, forward scattered light 132 is transmitted through the fluidic channel 116 when a particle 200 passes through one of the excitation beams in the interrogation region 122. Fluorescence 130 may be generated, depending on the particular fluorophore(s), as a particle 200 moves through one or all of the excitation beams 108, 110, 112.

In order to process the output of the system 100, and ensure that each of the collected signals is assigned to the correct particle in a sample, the side scatter, forward scatter and fluorescence signals from the various laser spots 109, 111, 113 can be synchronized. To do this, the flow speed of the fluid stream in the fluidic channel 116 is determined. In one embodiment, the flow speed of the fluidic channel may be externally controlled, and therefore has a known value. In another embodiment, the spacing between the individual laser spots 109, 111, 113 may be used to obtain the flow speed of the individual particles in the fluid stream. If the spacing between each of the laser spots 109, 111, 113 is known, the speed of the fluid flow may be determined by the time at which one or more of the emission signals from the laser spots 109, 111, 113 are received at the detectors 126. The system 100 may combine each of the scatter and emission signals into a single flow event, provide closed-loop flow speed regulation and precisely synchronize actuation of a deflection system, which is used to sort a particle under interrogation into a capture channel of interest.

The present μFACS system 100 may provide several advantages over existing approaches. First, this approach is compatible with planar microfluidic chips. Planar microfluidic chips (as compared to other devices, such as cuvettes) can offer more flexibility, for example, by integrating the sorting architecture directly onto the chip. Further, a planar microfluidic chip may be disposable to avoid contamination between sets of samples. Second, this approach may allow for a more compact optical setup, while providing as many illumination inputs and outputs as existing FACS systems. Third, this setup may have a simpler method of alignment as all excitation and emission paths pass through a single element—the objective 120. Fourth, this approach may allow for a more economical detection approach since multi-element detectors could be used (each detector would be responsible for a single detection wavelength), thereby allowing for more channels with fewer detectors.

Example Method

Figure 4:
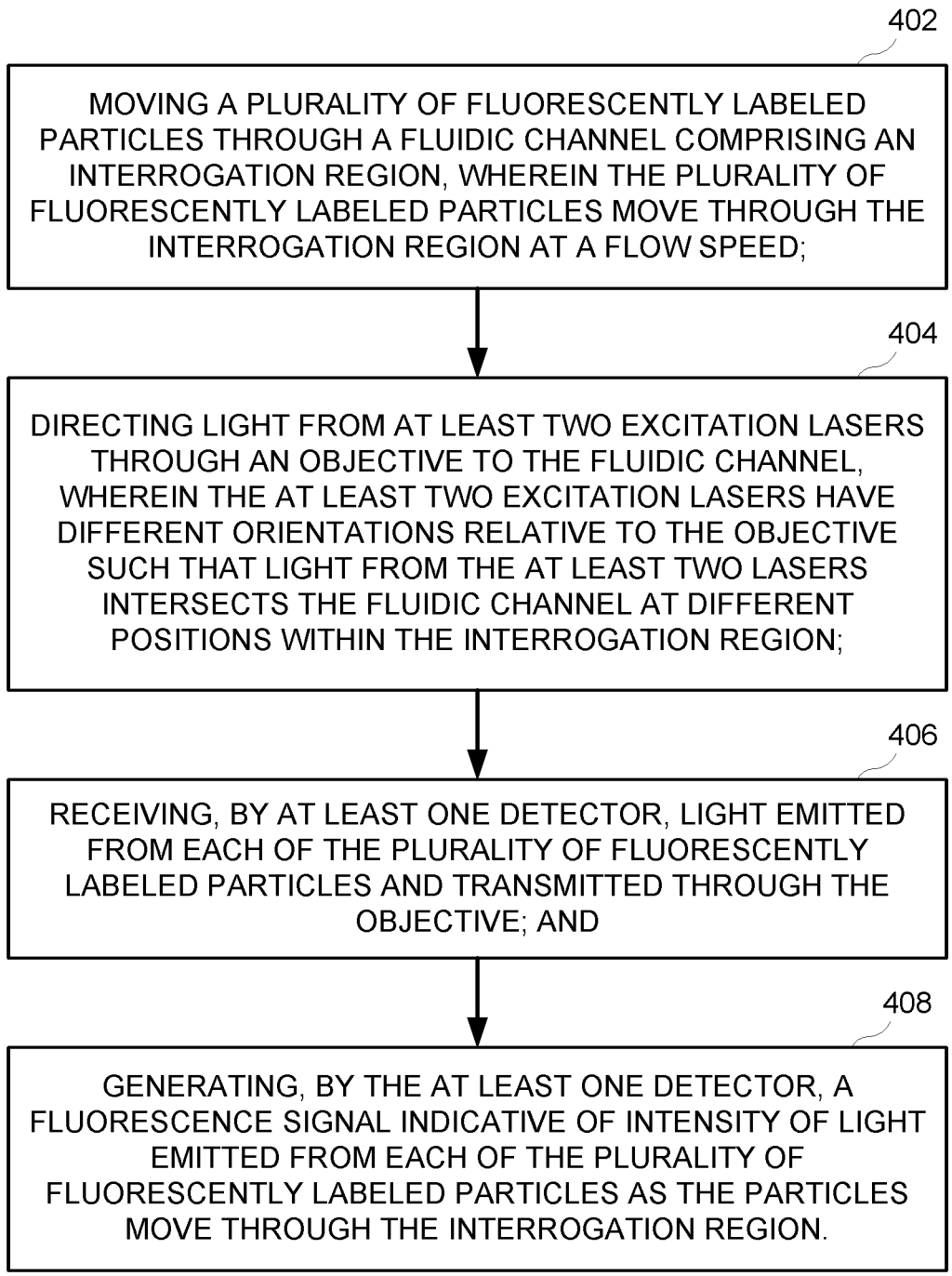
FIG. 4 is a flow chart of an example method.

A flowchart of an example method 400 for operating a μFACS system having at least two lasers to collect one or more of fluorescent, side scatter or forward scatter light, is shown in FIG. 4. In a first step (402), a plurality of fluorescently labeled particles is moved through a fluidic channel, including an interrogation region, of a μFACS system, such as system 100. The plurality of fluorescently labeled particles moves through the interrogation region at a flow speed, which may be known or measured during operation of the system. The plurality of particles may be obtained from a sample source, such as a microtiter plate, by, for example, a probe in fluid communication with the fluidic channel. In some examples, the particles are drawn from the sample source into the fluidic channel by means of a pump, such as a peristaltic pump. The light from at least two excitation lasers is directed through an objective to the fluidic channel. (404). As described above with respect to system 100, each of the at least two excitation lasers have different orientations relative to the objective, such that light from the at least two lasers intersects the fluidic channel at different positions within the interrogation region. Light emitted from each of the plurality of fluorescently labeled particles is transmitted through the objective, and is received by at least one detector. (406). The at least one detector generates a fluorescence signal corresponding to the intensity of light emitted from each of the plurality of fluorescently labeled particles, as the particles move through the interrogation region. (408).

The method may also include steps for collecting side and forward scatter light with a μFACS system having at least two lasers, such as system 100. In some examples, a portion of the light from one of the at least two lasers is directed to a location in the fluidic channel for side scatter measurements. The location could be, for example, within the interrogation region or upstream of the interrogation region with respect to the direction of flow in the fluidic channel. At least one side scatter detector receives side scattered light from each of the plurality of fluorescently labeled particles and generates a side scattered signal. The side scattered light is, in some examples, emitted from within the fluidic channel. In some examples, at least one forward scatter detector receives forward scattered light from each of the plurality of fluorescently labeled particles and generates a forward scattered signal. In some examples, the forward scattered light is transmitted through the fluidic channel.

The generated fluorescence, forward scatter, and side scatter signals attributed to a single particle of the plurality of particles can also be synchronized by the system 100. In some examples, the various signals may be synchronized based, at least in part, on the flow speed of the plurality of particles in the fluidic channel. If, for example, the flow speed is known or determined, the system may identify certain events in the fluorescence, forward scatter, and side scatter signals as being attributable to a single particle. The flow speed may be, in some examples, be set and controlled by a pump. Alternatively, the flow speed may be measured or determined. In one example, the flow speed may be determined based, at least in part, on the timing of generation of fluorescence signals from each excitation laser and the distance between the intersection points of the lasers. Specifically, the flow speed may be determined based, at least in part, on the time that a first fluorescence signal is generated by the at least one detector as a particle of the plurality of particles passes through the position that a first laser of the at least two excitation lasers intersects the fluidic channel, the time that a second fluorescence signal is generated by the at least one detector as the particle passes through a second position that a second laser of the at least two excitation lasers intersects the fluidic channel, and the distance between the first and second positions. Other methods of measuring or otherwise determining the flow speed are contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system comprising:
   at least two excitation lasers configured to emit excitation light;
   a planar microfluidic chip, wherein a fluidic channel is defined in the planar microfluidic chip;
   an objective optically coupled to the at least two excitation lasers via a first dichroic, wherein the at least two excitation lasers have different orientations relative to the objective such that the excitation light emitted from the at least two excitation lasers passes through the objective and intersects the fluidic channel at different positions within an interrogation region, and wherein the fluidic channel directs a flow of a plurality of fluorescently labeled particles through the interrogation region;
   a plurality of detectors comprising at least a first detector and a second detector; and
   an optical system optically coupled to the objective and the plurality of detectors, wherein the optical system comprises the first dichroic, a tube lens, and a second dichroic optically coupled to the first dichroic via the tube lens, and wherein the optical system is configured to (i) direct a first wavelength of light emitted from the plurality of fluorescently labeled particles and transmitted through the objective to the first detector via a first optical path and (ii) direct a second wavelength of light emitted from the plurality of fluorescently labeled particles and transmitted through the objective to the second detector via a second optical path.

2. The system of claim 1, wherein each detector of the plurality of detectors comprises a multi-element detector.

3. The system of claim 1, wherein the plurality of detectors further comprises a third detector, and wherein the optical system is further configured to direct a third wavelength of light emitted from the plurality of fluorescently labeled particles and transmitted through the objective to the third detector via a third optical path.

4. The system of claim 1, wherein the plurality of fluorescently-labeled particles include fluorescently-labeled particles that emit light at the first wavelength in response to the excitation light and fluorescently-labeled particles that emit light at the second wavelength in response to the excitation light, wherein the first detector is configured to detect the first wavelength and the second detector is configured to detect the second wavelength.

5. The system of claim 1, wherein first dichroic transmits the excitation light emitted from the at least two excitation lasers and reflects light emitted by the plurality of fluorescently-labeled particles.

6. The system of claim 5, wherein each of the at least two excitation lasers emits excitation light at a different excitation wavelength, and wherein the first dichroic has narrow transmission peaks for each excitation wavelength.

7. The system of claim 5, wherein the first dichroic comprises a dot optic.

8. The system of claim 1, wherein the first dichroic reflects the excitation light emitted from the at least two excitation lasers and transmits light emitted by the plurality of fluorescently-labeled particles.

9. The system of claim 8, wherein the plurality of fluorescently-labeled particles comprises a plurality of different fluorophores configured to emit light at a plurality of different emission wavelengths in response to the excitation light, and wherein the first dichroic has narrow transmission peaks for each emission wavelength.

10. The system of claim 8, wherein the first dichroic comprises a dot mirror.

11. The system of claim 1, wherein the plurality of detectors further comprises a detector for detecting forward scattered light scattered through the fluidic channel.

12. The system of claim 1, wherein the plurality of detectors further comprises at least one detector for detecting side scattered light from the fluidic channel.

13. The system of claim 12, further comprising at least one optical element for directing a portion of the excitation light emitted from one of the at least two lasers to the fluidic channel at a position upstream of the interrogation region with respect to the direction of flow of the plurality of fluorescently labeled particles in the fluidic channel.

14. The system of claim 1, wherein each of the at least two excitation lasers emits excitation light at a different excitation wavelength.

15. The system of claim 1, further comprising a first bandpass filter in the first optical path and a second bandpass filter in the second optical path.

16. The system of claim 13, wherein the at least one optical element comprises a beam splitter.

17. The system of claim 16, wherein the at least one optical element further comprises a mirror.

18. The system of claim 1, wherein the planar microfluidic chip is disposable.

19. The system of claim 1, wherein the planar microfluidic chip includes an integrated sorting architecture.

* * * * *